March 15, 1955 G. LUSHENKO 2,704,047
INDICATING MECHANISM FOR RAM OPERATED AGRICULTURAL TOOL
Filed March 5, 1953
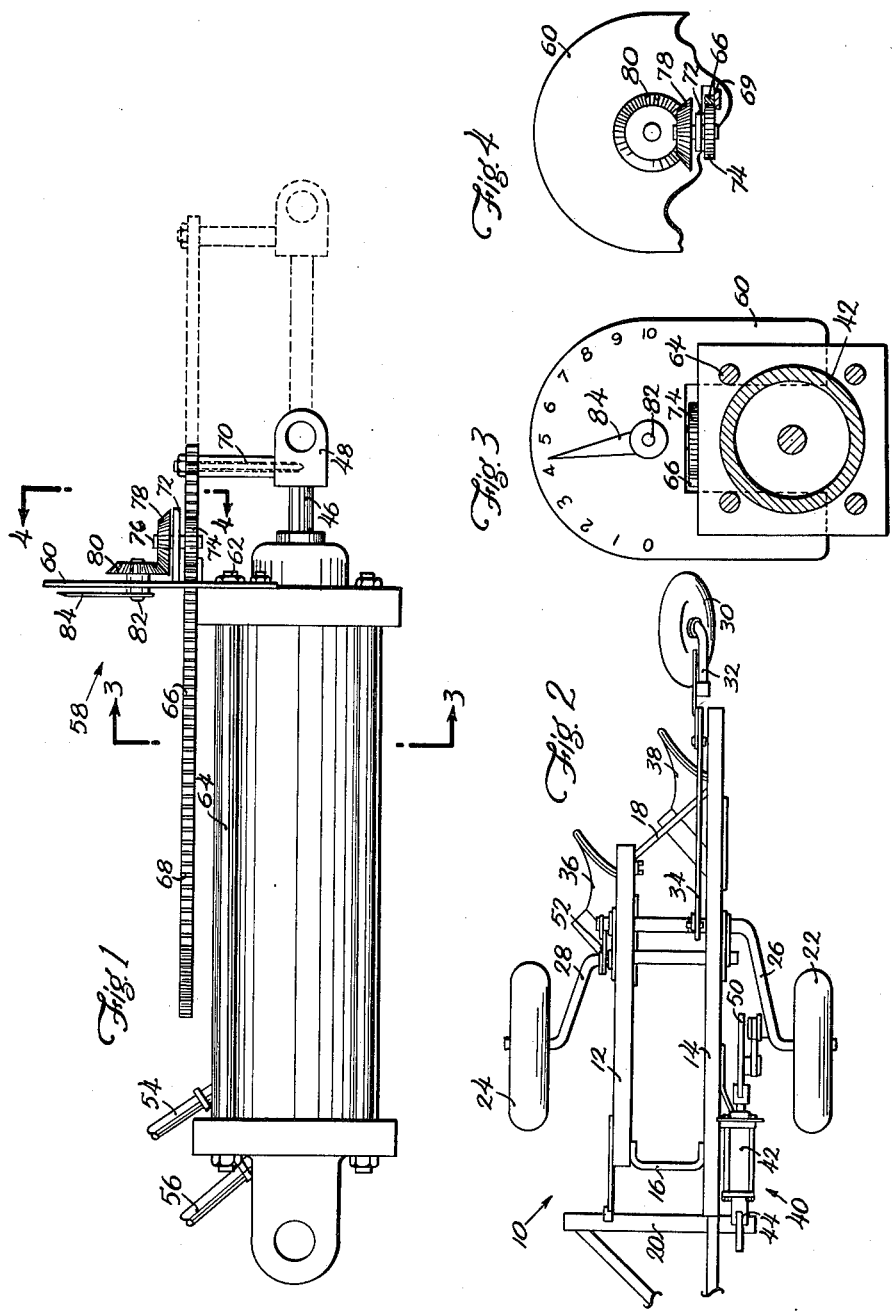
INVENTOR.
Gordon Lushenko
BY Whiteley & Caine
Attorneys United States Patent Office 2,704,047
Patented Mar. 15, 1955

2,704,047

INDICATING MECHANISM FOR RAM OPERATED AGRICULTURAL TOOL

Gordon Lushenko, Max, N. Dak.

Application March 5, 1953, Serial No. 340,609

1 Claim. (Cl. 116—124)

The present invention relates to an indicating mechanism which is used with agricultural devices containing a ground working tool and a hydraulic ram connected to the tool for holding the same in a locked position with relation to the device.

In plowing or tilling the soil it is conventional practice to use ground working tools which can be adjusted for the depth or working position, and such tools are customarily moved and locked in an adjusted position by a suitable ram that receives hydraulic fluid from a pump operated by the tractor which is used for moving the agricultural device. Either through variations in the soil or in turning the machine at the end of a furrow, or for other reasons, the tool may be elevated or depressed or adjusted with relation to the surface of the ground, and it is desirable for the operator to be able to accurately gauge the depth of the tool in order to maintain the furrows of even depth. In general the operator must rely on visual appearance of the tool and in many instances this is difficult because the device may be of the trail-behind type and the operator must primarily concern himself with steering and operating the tractor. Furthermore, soil conditions are likely to change, thereby requiring variation in the adjustment of the device since harder soil will be likely to cause or require an elevation of the tool.

In the present invention it is proposed to provide an easily observed indicating mechanism which is mounted on or in relation to one part of the ram and containing a positive acting gear train forming a connection between the movable part of the ram and a movable indicator which is moved relative to a stationary index.

An object of the invention is to provide an indicating mechanism which is used in connection with a ram operated ground working tool, which includes a stationary part and a movable part and a positive acting gear train between a moving part of the ram and the movable part of the indicating mechanism.

Another object is to provide an indicating mechanism including a stationary indexing portion supported on one portion of a ram, a movable indexing portion, and a gear train including a rack bar which connects a moving portion of the ram with the movable indexing portion.

Other and further objects may become apparent from the following description and claims and in the appended drawing in which:

Fig. 1 is a side elevation of a hydraulic ram and the indicating mechanism forming the present invention;

Fig. 2 is a plan view of an agricultural device showing the mode of connecting one portion of the ram with the ground working tools;

Fig. 3 is a front elevation of a portion of the device shown in Fig. 1, taken on line 3—3; and, Fig. 4 is a rear elevation of a portion of the structure shown in Fig. 3 and taken on line 4—4 of Fig. 1.

Referring now to the several views of the drawing, the invention will be explained in detail. Referring first to Fig. 2, general reference numeral 10 indicates one form of agricultural device, specifically a double furrow plow consisting of main frame members 12 and 14 which are interconnected by braces 16 and 18. A triangular hitch designated generally at 20 is connected between the main frames 12 and 14 and is adapted for connection to the rear end of a conventional tractor. Ground engaging wheels 22 and 24 on either side of the device are mounted on crank shaped axles 26 and 28 which are each suitably journalled to the main frame members 12 and 14. A rear furrow heel 30 is connected to an axle 32 and through a lever mechanism indicated at 34 means are provided for moving the furrow wheel 30 in conjunction with axle 26. A pair of plowshares 36, 38 are suitably connected to each of the frame members 12 and 14. Mounted on frame member 14 is a hydraulic ram indicated generally at 40 consisting of a cylinder 42 which is pivotally connected at 44 to a portion of the plow frame to provide for pivotal movement of one end of the cylinder 42. Within cylinder 42, but not specifically shown, is a piston having a connecting rod 46 with a clevis 48 which is adapted for connection through a conventional linkage designated at 50 with axle 26. Another linkage designated at 52 connects axle 26 with axle 28. As shown in Fig. 1, a pair of flexible tubes 54, 56 connect to a suitable pumping mechanism carried by the tractor for providing hydraulic fluid on either side of the piston within cylinder 42 to move the same relative to the cylinder and hold the piston in locked position. The portion of the mechanism mentioned heretofore is conventional.

Referring now to Figs. 1, 3 and 4, is shown an indicating mechanism designated generally at 58 and consisting of a stationary index 60 which is mounted on one end of cylinder 42 and held thereto by nuts 62 secured to the outer ends of the brace rods 64 on the cylinder. As clearly indicated in Fig. 3, the indexing member 60 carries a plurality of numerals thereon indicating the extent of movement of piston rod 46, preferably in inches. A rack bar 66 having a multiplicity of gear teeth 68 extends through the indexing member 60 riding on a guide 69, and is secured on one end to an upright piece 70 which is joined to clevis 48 on the forward end of the piston rod 46. A bearing member 72 extends from the rear side of indexing member 60 and supports a rod 76 that carries a pinion gear 74 which meshes with the teeth 68 on the rack bar 66. The rod 76 extends from pinion gear 74 through the bearing plate 72 and carries on its upper end a bevel gear 78 which meshes with a bevel gear 80 that is mounted on a bearing rod 82. An index pointer 84 is also secured to bearing rod 82. The arrangement being such as to provide a positive acting gear train between rack bar 66 and the indicator 84.

In operation, the agricultural device shown by reference character 10 is a trail-behind plow which would be connected in rear of a conventional tractor, and when not in use for ground working purposes the piston rod 46 would be in the position shown in Fig. 2 with the axles 26 and 28 rotated sufficiently to hold the plowshares above the surface of the ground. When it is desired to start the plowing operation, fluid is supplied through either tube 54 or 56 to move the piston within cylinder 42 a predetermined distance necessary to give a furrow of desired depth. Movement of the piston causes linkage 50 to rotate axle 26 and thereby regulate the position of wheel 22 with respect to the ground. This movement would be transmitted to axle 28 by the linkage 52 and to the rear furrow wheel by the linkage 34. Since the indicating plate 60 is on the rear end of the cylinder it will be plainly visible to the operator and he can thus designate the depth of plowing by observing the index on plate 60.

The important feature of the present invention is to provide an indexing mechanism which is positively connected to the ram and moved through an accurately recording gear train consisting of the rack bar and the several gears which are interconnected between it and the indicating pointer 84.

My invention is defined in the terms of the appended claim.

I claim:

In an agricultural device embodying an elevatable ground working tool, a hydraulic ram having a cylinder and a piston supported for movement within the cylinder and connected to the tool for moving and rigidly holding the same relative to the ground, in combination with said ram of an indicating mechanism for designating the position of the tool consisting of a stationary index scale supported on the cylinder, a movable indicator supported for movement relative to the scale, a gear secured to said movable indicator, a rack bar connected to the piston of said hydraulic ram, and a gear train operably connecting said rack bar to said gear, whereby said indicator at all times indicates the position of the piston and as a consequence the extent of depth of said tool.

References Cited in the file of this patent

UNITED STATES PATENTS

| | | |
|---|---|---|
| 437,800 | Robinson | Oct. 7, 1890 |
| 1,581,268 | Kaminski | Apr. 20, 1926 |
| 2,050,446 | Meyer | Aug. 11, 1936 |
| 2,325,389 | Gardner | July 27, 1943 |
| 2,589,896 | Toland | Mar. 18, 1952 |